F. H. HOENK.
TENSION INDICATOR FOR SEWING MACHINES.
APPLICATION FILED SEPT. 30, 1909.
971,842.
Patented Oct. 4, 1910.
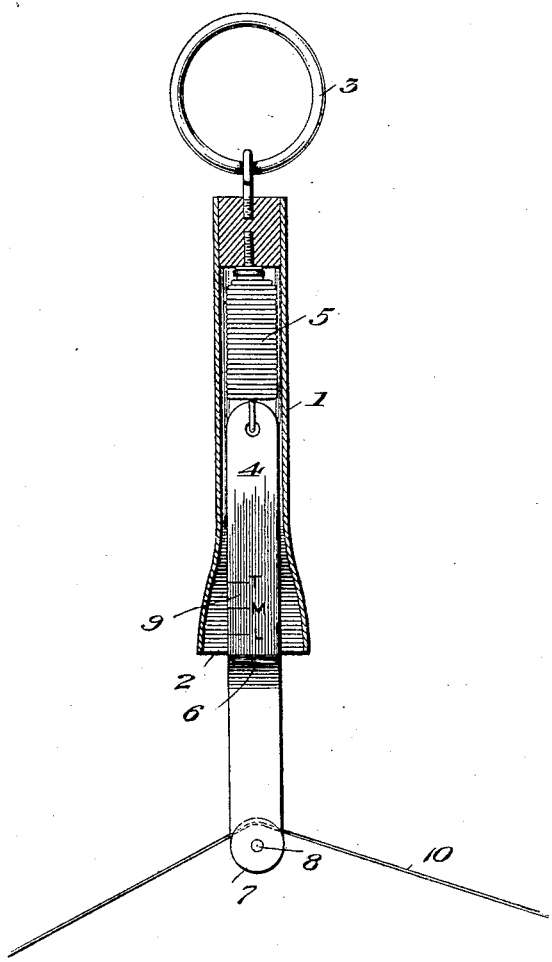
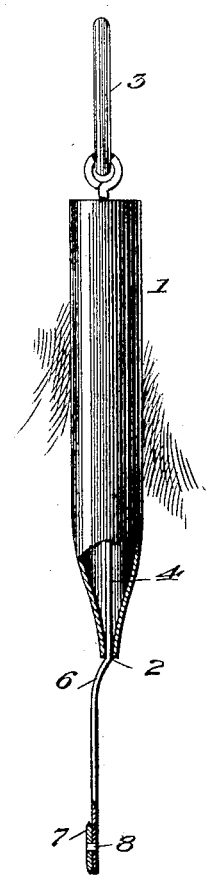

UNITED STATES PATENT OFFICE.

FREDERICK H. HOENK, OF EVANSVILLE, INDIANA.

TENSION-INDICATOR FOR SEWING-MACHINES.

971,842.                 Specification of Letters Patent.         Patented Oct. 4, 1910.

Application filed September 30, 1909. Serial No. 520,332.

*To all whom it may concern:*

Be it known that I, FREDERICK H. HOENK, a citizen of the United States, residing at Evansville, county of Vanderburg, and State of Indiana, have invented certain new and useful Improvements in Tension-Indicators for Sewing-Machines, of which the following is a specification.

This invention relates to tension indicators for sewing machines.

It is necessary to have the tension of both threads of a sewing machine equal or the machine will not sew properly. A skilful machine repairer can tell the correct tension of the thread by touch but one who is unskilled cannot do so.

The present invention has for its object the provision of a simple, inexpensive, and efficient portable device by which an unskilled sewing machine repairer may readily adjust the tension of the threads so that he will not be required to rely upon his sense of feeling or touch for that purpose.

In carrying out the invention I provide a portable indicator adapted to be held by the hand, having a casing of novel construction, a scale bar of novel form and guided in a novel manner in its movements in and out of the casing, and retracted by a spring retained therein in an improved manner, together with novel means for engaging the thread, suitable indicia being provided on the scale bar to indicate the three tensions commonly employed, the loose, the medium, and the tight tensions, the specific construction of one form of the invention being set forth fully hereinafter and recited in the appended claim.

In the accompanying drawings:—Figure 1 is a sectional elevation of the device; and Fig. 2, a view taken at right angles thereto, partly in section.

The numeral 1 designates a casing which may be of any desired form, preferably tubular, whose lower end is flattened to provide a narrow elongated diametrically disposed guide slot 2. Secured to the upper end of the casing is a ring 3 adapted to receive the finger of the operator.

Contained within the casing is a flat scale bar 4 which is suspended from the end of the casing by a contractile spring 5, the lower part of the scale bar being preferably offset to provide a shoulder 6 adapted, by its abutment with the slotted end of the casing 1, to limit its retraction by the spring 5, the lower or outer end of the scale bar being provided with a disk 7 secured by a pin, rivet or other fastening 8, the disk constituting, in connection with the scale bar, a thread clamp.

The scale bar has indicia and graduations 9 representing the loose, medium, and tight tensions.

In using the invention, the ring 3 is grasped and the thread 10 of the sewing machine is engaged between the disk 7 and the scale bar. The tension of the thread 10 causes the scale bar to be pulled outwardly, according to the tension of the thread, the indicia and graduations 9 indicating in connection with the slotted end 2 of the casing 1, the tension. The operator can then regulate the usual tension regulator on the sewing machine so that the correct tensions of the threads are obtained.

Having thus described my invention, what I claim as new and desire to secure by Letters Patent, is:—

In a tension indicator for sewing machines, the combination with a tubular casing having a flattened slotted end constituting a guide, of a flat and relatively wide scale bar slidable in and out of the casing and through the said slot and having graduations on its part within the casing adapted to register with the said slotted end as the scale bar is pulled out, the outer or exposed part of said scale bar being bodily offset so as to be adapted to abut the flattened end of the casing to limit the retraction of said scale bar into the casing, a thread clamp carried on the outer part of the scale bar, and a retracting spring contained within the casing and connected to the scale bar and normally keeping the scale bar retracted, its graduations covered, and the offset part abutting the end of the casing.

In testimony whereof, I hereunto affix my signature in presence of two witnesses.

FREDERICK H. HOENK.

Witnesses:
F. C. GORE,
JOHN P. DOWNEY.